(12) United States Patent
Roberts et al.

(10) Patent No.: US 8,516,255 B2
(45) Date of Patent: Aug. 20, 2013

(54) METHODS AND APPARATUS FOR PEER-TO-PEER TRANSFER OF SECURE DATA USING NEAR FIELD COMMUNICATIONS

(75) Inventors: John Roberts, Beaverton, OR (US); Kristina Loraine Kister Herrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 12/776,510

(22) Filed: May 10, 2010

(65) Prior Publication Data

US 2011/0276802 A1 Nov. 10, 2011

(51) Int. Cl.
*H04L 9/32* (2006.01)

(52) U.S. Cl.
USPC ............... 713/171; 713/193; 726/26; 726/27; 380/27

(58) Field of Classification Search
USPC .............. 713/171, 193; 726/26, 27; 380/270
See application file for complete search history.

(56) References Cited

U.S. PATENT DOCUMENTS

| | | | | |
|---|---|---|---|---|
| 5,710,910 A | * | 1/1998 | Kehl et al. | 713/400 |
| 7,383,446 B1 | * | 6/2008 | Hatanaka et al. | 713/193 |
| 8,032,752 B2 | * | 10/2011 | Fujiwara et al. | 713/171 |
| 8,091,137 B2 | * | 1/2012 | Karp et al. | 726/26 |
| 2005/0226420 A1 | * | 10/2005 | Makela et al. | 380/270 |
| 2007/0016781 A1 | * | 1/2007 | Asokan et al. | 713/173 |
| 2008/0097900 A1 | | 4/2008 | Berntsen et al. | |
| 2009/0271276 A1 | | 10/2009 | Roberts | |
| 2010/0082478 A1 | * | 4/2010 | Van Der Veen et al. | 705/39 |
| 2010/0132047 A1 | * | 5/2010 | Rodriguez et al. | 726/27 |

FOREIGN PATENT DOCUMENTS

WO WO9908238 2/1999

OTHER PUBLICATIONS

International Search Report and Written Opinion—PCT/US2011/035642, International Search Authority—European Patent Office—Sep. 22, 2011.

* cited by examiner

*Primary Examiner* — Kambiz Zand
*Assistant Examiner* — Amare F Tabor
(74) *Attorney, Agent, or Firm* — James K. O'Hare

(57) ABSTRACT

The present invention discloses an apparatus and method of transferring data from a first device to a second device. The method includes transmitting a request to transfer the data from the first device to the second device, receiving, at the first device, a decryption key to allow transfer of the data stored in a memory of the first device, receiving, at the second device, an encryption key, and transmitting the data from the first device to the second device using peer-to-peer communications. The method also includes encrypting the data at the second device using the encryption key, storing the encrypted data in a memory of the second device, receiving, at the first device, an acknowledgement from the second device, the acknowledgement indicating that the data has been encrypted and stored in the memory of the second device, and deleting the data from the memory of the first device.

12 Claims, 5 Drawing Sheets

METHODS AND APPARATUS FOR PEER-TO-PEER TRANSFER OF SECURE DATA USING NEAR FIELD COMMUNICATIONS

FIELD

The invention relates generally to the peer-to-peer transfer of secure data. More particularly, the invention relates to methods and apparatus for peer-to-peer transfer of secure data using near field communications.

BACKGROUND

Use of credit cards, debit cards, access cards, and similar payment instruments has become the universally preferred means for consumer purchases of goods and services. For example, in order for a consumer to make a purchase, the consumer would have to have a payment instrument such as a credit card or a debit card. The payment instrument may include a magnetic strip or may be "contactless" in nature. In either case, personal financial information of the person to whom or entity to which the payment instrument is issued is embedded in the payment instrument so that a point-of-sale device is capable of reading to authorize a financial transaction.

At the point-of-sale device, the consumer or user of the payment instrument generally swipes the payment instrument through the point-of-sale device for the transaction to take place. Over time and repetition of use, the magnetic strip on the payment instrument degrades and the personal financial information becomes unreadable by the point-of-sale device. Degradation of the magnetic strip may cause payment rejection although the consumer may be the authentic owner of the payment instrument. Also, the payment instrument may get lost or stolen causing the owner of the payment instrument the potential hassles of unintended charges and liabilities, having to cancel the payment instrument, having to obtain a new payment instrument, and waiting for the new payment instrument to arrive.

A "contactless" payment instrument such as a mobile wireless instrument (e.g., a Smart Phone or an iPhone®) generally includes a memory chip and an antenna. Information stored on the memory chip, referred to in this disclosure as "financial data," may be encoded in such a manner that the mobile wireless instrument may decode the financial data for use by the mobile wireless instrument. The process of decoding the financial data may be performed using a decoder or a processor executing a decoding algorithm or decryption algorithm with a decryption key.

The mobile wireless instrument may use the financial data to conduct a financial transaction across a credit network. The financial transaction, such as the payment for goods or services, may be transacted across a near field communication (NFC) enabled point-of-sale device. NFC technologies communicate over magnetic field induction, where at least two loop antennas are located within each other's "near field," effectively forming an air-core transformer that operates within a globally available and unlicensed radio frequency which, as indicated, is an industrial, scientific and medical (ISM) band of about 13.56 MHz, with a bandwidth of almost 2 MHz.

When the consumer desires to conduct a financial transaction, the consumer is not required to have a payment instrument in the consumer's possession. Rather, the consumer can place his or her mobile wireless instrument in operational proximity to the point-of-sale device to initiate a financial transaction. Thereafter, the mobile wireless instrument sends an instruction to the point-of-sale device to authorize the financial transaction. The consumer may also be required to enter a personal identification number (PIN) to complete the financial transaction.

The financial data in the memory chip of the mobile wireless instrument is encrypted to protect unauthorized access or use. A decryption key is needed to decrypt the encrypted financial data. Credit card companies such as EMV (Europay, MasterCard and VISA) distribute one or more decryption keys to selected and authorized businesses for their point-of-sale devices.

Standard ISO 7813 defines the standards for financial data for payment instruments. Such financial data may include the name of the primary account holder, the primary account number, the country code, the expiration date of the payment instrument, and the PIN, among other data and information pertaining to a user of the payment instrument.

One drawback of storing the financial data on a mobile wireless instrument is the lack of being able to remove or transfer the financial data to another mobile wireless instrument. That is, once the financial data is stored on the memory chip of the mobile wireless instrument, the financial data cannot be removed or transferred to another mobile wireless instrument. This is problematic because with the continuous introduction of new mobile wireless instruments, users are looking to change their mobile wireless instruments quite frequently. The lack of being able to remove or transfer the financial data prevents the user from allowing or requesting the financial data to be stored on the mobile wireless instrument because of the fear of not being able to remove or transfer the data upon upgrade or change in the mobile wireless instrument.

Accordingly, a need exists in the industry for new and useful methods and apparatus for peer-to-peer transfer of secure data using near field communications.

SUMMARY

The secure peer-to-peer data transfer systems and methods disclosed, illustrated, and claimed in this document addresses the above-stated needs by providing an apparatus, systems and methods for peer-to-peer transfer of secure data using near field communications. The present invention discloses an apparatus and methods for transferring data from a first device to a second device. One method includes transmitting a request to transfer the data from the first device to the second device, receiving, at the first device, a decryption key to allow transfer of the data stored in a memory of the first device, receiving, at the second device, an encryption key, and transmitting the data from the first device to the second device using peer-to-peer communications. The method also includes encrypting the data at the second device using the encryption key, storing the encrypted data in a memory of the second device, receiving, at the first device, an acknowledgement from the second device, the acknowledgement indicating that the data has been encrypted and stored in the memory of the second device, and deleting the data from the memory of the first device.

In one embodiment, the present invention includes an apparatus for transferring data. The apparatus includes a first device configured to transmit a request to transfer the data to the second device, receive a decryption key to allow transfer of the data stored in a memory of the first device, transmit the data to the second device using peer-to-peer communications, receive an acknowledgement from the second device, the acknowledgement indicating that the data has been encrypted and stored in a memory of the second device, and delete the data from the memory of the first device. The apparatus also includes a second device configured to receive an encryption key, encrypt the data using the encryption key, and store the encrypted data in a memory of the second device.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the secure peer-to-peer data transfer systems will become apparent to those skilled in the art when read in conjunction with the following description, drawing figures, and appended claims.

The foregoing has outlined broadly the more important features of the invention to better understand the detailed description that follows, and to better understand the contributions to the art. The secure peer-to-peer data transfer systems are not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the secure peer-to-peer data transfer systems, which is measured by the claims, nor intended to limit the scope of the claims.

BRIEF DESCRIPTION OF THE DRAWING

The novel features, objects, and advantages of the invention will become more apparent from the detailed description set forth below when taken in conjunction with the drawings, wherein.

DETAILED DESCRIPTION

Definitions

Figure 1:
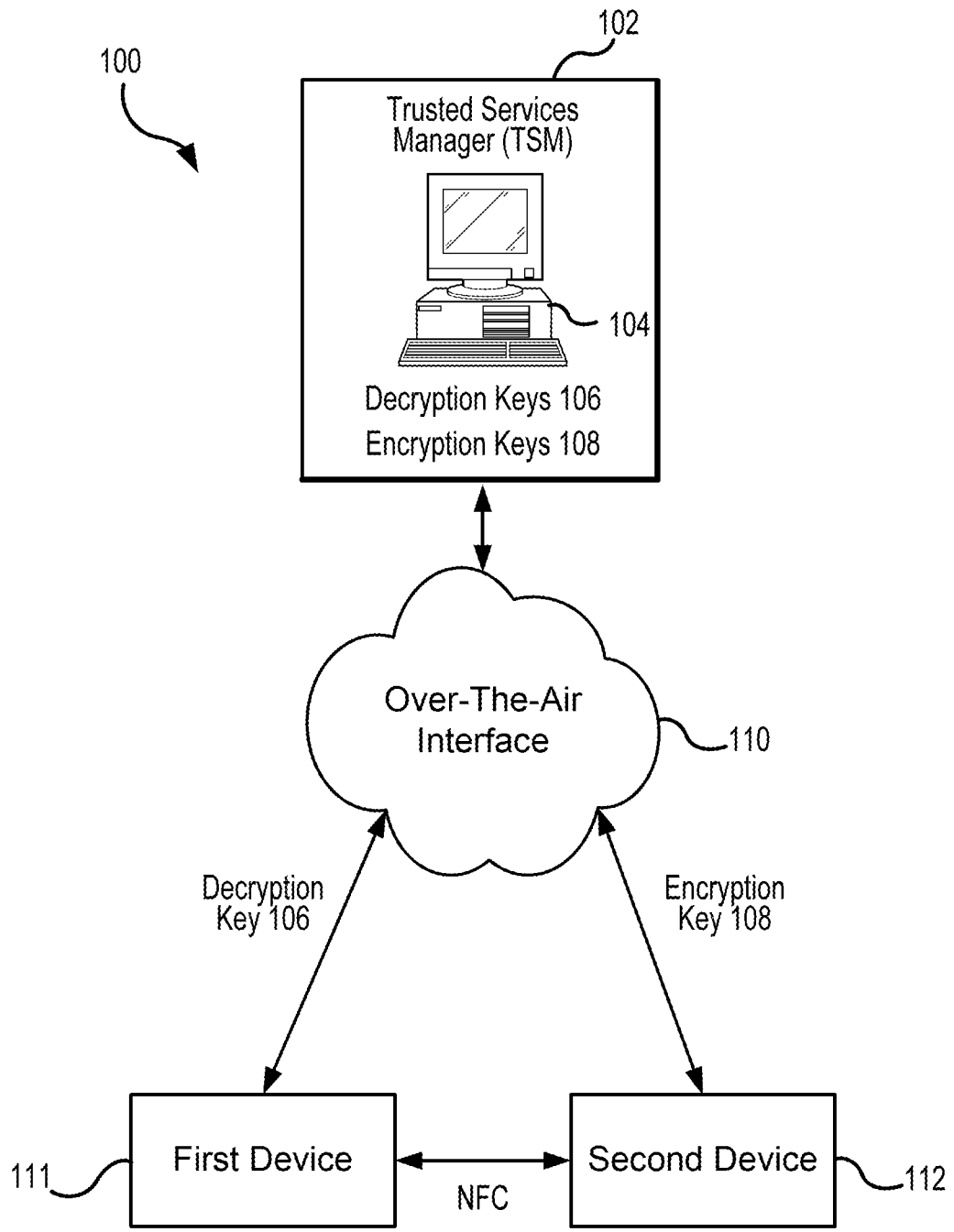
FIG. 1 is a simplified block diagram of a system for peer-to-peer transfer of secure data using NFC in accordance with various embodiments.

The term "mobile wireless instrument" as used in this document means at least a wireless communication instrument used in a wireless communications system that, in general, includes an array of operatively connected communication devices adapted to receive and transmit at least electromagnetic signals across the system without cables using infrared light and radio signals, and also includes a telecommunications system in which electromagnetic waves, rather than some form of wire, carry the signal over all or part of the communication path. The mobile wireless instrument may also receive and transmit signals from satellites, including satellites that are part of the Global Positioning System (GPS), Galileo, GLONASS, NAVSTAR, GNSS, a system that uses satellites from a combination of these systems, or any satellite positioning system subsequently developed (collectively referred to generally in this document as a Satellite Positioning System (SPS)). As used in this document, an SPS also includes pseudolite (pseudo-satellite) systems.

The term "device" means and includes at least a cellular phone, a pager, a satellite telephone, a two-way pager, a personal digital assistant (PDA) having wireless capabilities, a portable computer having wireless capabilities, a home entertainment system control box, a wireless local area network, and any other type of wireless device having transmission capabilities that may also be one or more versions of a personal communications services device (PCS) including time division multiple access (TDMA), a code division multiple access (CDMA), a global system for mobile (GSM), non-voice communications apparatus, and text transmission apparatus, among others.

The term "point-of-sale device" means at least a terminal or other device including peer-to-peer near field communications devices and subject at least to standards ISO 14443-compliant contactless card, and ISO 18092-compliant FeliCa cards, among others. Thus, a point-of-sale device includes not only credit card and debit card readers (that may include touch screens), but also automatic and automated teller machines (ATM's), among others.

The term "credit network" means a national and/or worldwide system in which financial institutions, merchants, and public users are connectable. Credit networks were designed for use primarily with payment instruments. Payment instruments allow users, or customers, to use, for example, a credit or debit card to purchase goods or services in substantially real time following authentication of the customer, and approval and/or authorization of the transaction by a financial institution. A user, or customer (in this document, "user" or "customer") is issued a payment instrument such as a credit card or a debit card after an account has been approved by the credit provider, often a financial institution such as a bank, with which the user is able to make purchases from merchants who accept the credit, up to a pre-established limit. In addition, a "card association" often is included in the credit network, and includes among others VISA® and MasterCard® which act as gateways between a financial institution and issuer for authorizing and funding transactions, the issuer being a financial institution or other organization that issued the credit/debit card to the cardholder.

The terms "financial data" and "financial information" mean any and all economic data related to matters of money. Financial data may be personal and/or commercial. Financial data and information is concerned with management of money, banking, credit, investments and assets. Accordingly, the term financial data includes at least user financial data including, but not limited to, the name of a primary account holder, the primary account number associated with the primary account holder, a country code, an expiration date, and a personal identification number.

The term "financial transaction" means at least the use of financial data and financial information used in conducting a purchase across a credit network using financial data that originates in a payment instrument.

The term "payment instrument" means at least a credit card, a debit card, a "contactless" card, debit lines, debit coupons, and cash equivalents.

DESCRIPTION

Methods, apparatus, and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

FIG. 1 is a simplified block diagram of a system 100 for peer-to-peer transfer of secure data using NFC in accordance with various embodiments. The secure peer-to-peer transfer system 100 may include a trusted services manager (TSM) 102, an over-the-air interface 110, a first device 111, and a second device 112. The TSM 102 includes a memory 104 for storing decryption keys 106 and encryption keys 108. The TSM 102 also includes a processor, a transmitter, and a receiver. The first device 111 and the second device 112 may be NFC-enabled. As a person skilled in the art will appreciate, any future system similar or equivalent to NFC technology may be used to transfer secure data from the first device 111 to the second device 112.

Figure 2:
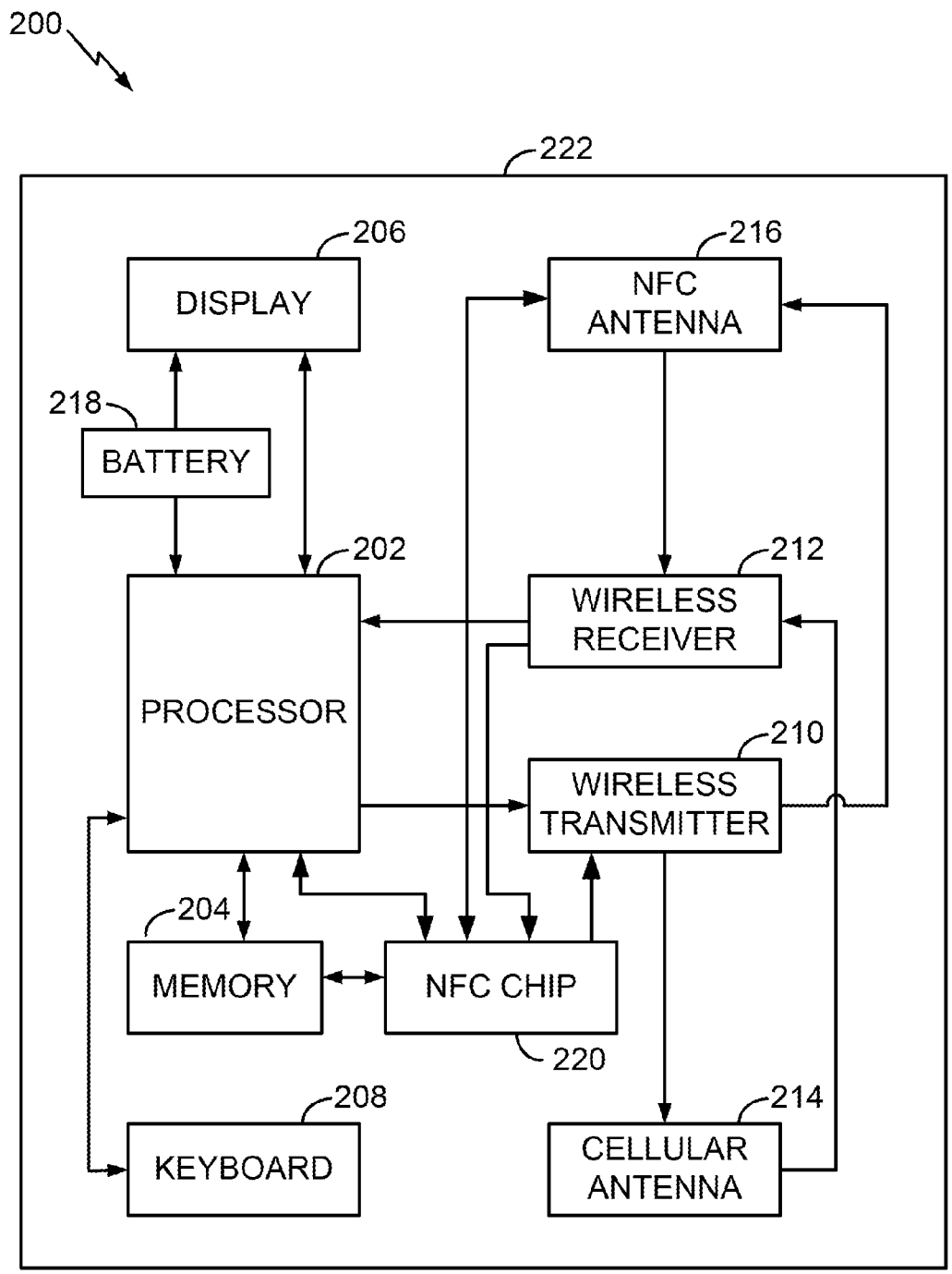
FIG. 2 is a block diagram of an exemplary wireless device configured for peer-to-peer transfer of secure data using NFC in accordance with various embodiments.

FIG. 2 is a block diagram of an exemplary wireless device 200 configured for peer-to-peer transfer of secure data using NFC in accordance with various embodiments. The wireless device 200 is an example of the first device 111 and the second device 112 shown in FIG. 1. The wireless device 200 is configured to receive and transmit signals and data in or using the over-the-air interface 110 and/or NFC. The wireless device 200 may include a processor 202, a memory 204, a display or a touch screen 206, a keyboard 208, a wireless transmitter 210, a wireless receiver 212, a first antenna 214, a second antenna 216, a power source 218 (e.g., a battery), and an NFC chip 220. The chips, components or modules may be attached or formed on a printed circuit board 222. The printed circuit board 222 can refer to any dielectric substrate, ceramic substrate, or other circuit carrying structure for carrying signal circuits and electronic components within the wireless device 200.

The processor 202 is capable of receiving the financial data using the second antenna 216, storing the financial data in the memory 204, processing (e.g., encrypting and/or decrypting) the financial data, and transmitting the financial data using the second antenna 216. The processor 202 can decrypt the financial data using the decryption key 106 and encrypt the financial data using the encryption key 108. The processor 202 may be implemented using hardware, software, firmware, middleware, microcode, or any combination thereof. The processor 202 may be an NFC chip, an Advanced RISC Machine (ARM), a controller, a digital signal processor (DSP), a microprocessor, an encoder, a decoder, circuitry, a processor chip, or any other device capable of processing data, and combinations thereof. The term "circuitry" may include processor circuitry, memory circuitry, RF transceiver circuitry, power circuitry, video circuitry, audio circuitry, keyboard circuitry, and display circuitry.

The memory 204 may include or store various routines and data. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data.

The machine readable instructions may be stored in the memory 204 and may be executed by the processor 202 to cause the processor 202 to perform various functions as described in this disclosure. The display 206 may be a LCD, LED, plasma display screen or a touch screen and the keyboard 208 may be a standard keyboard (e.g., a QWERTY layout) having letters and numbers. The keyboard 208 may be implemented on or using the touch screen.

The wireless transmitter 210 is coupled to the processor 202 and is used to encode and format the data for transmission via the first antenna 214 and/or the second antenna 216. The wireless transmitter 210 includes chips, circuitry and/or software that are used to transmit the data and/or signals that are received from the processor 202 to the first antenna 214 and/or the second antenna 216 for transmission over one or more channels.

The wireless receiver 212 is coupled to the processor 202 and is used to decode and parse the data after being received from the first antenna 214 and/or the second antenna 216. The wireless receiver 212 includes chips, circuitry and/or software that are used to receive the data and/or signals from the first antenna 214 and/or the second antenna 216. The data and/or signals are sent to the processor 202 for calculation and/or use by the processor 202.

The first antenna 214 may be positioned at a lower right portion of the wireless device 200 and the second antenna 216 may be positioned at an upper right portion of the wireless device 200. The first antenna 214 may be a cellular antenna, a GSM antenna, a CDMA antenna, a WCDMA antenna, or any other antenna capable of operating using the over-the-air interface 110. The second antenna 216 may be an NFC antenna, a WiFi antenna, a GPS antenna, or any other antenna capable of operating using NFC. The power source 218 supplies power to the components or modules shown in FIG. 2.

The NFC chip 220 is used to perform NFC. The NFC chip 220 can operate in conjunction with or independent of the processor 202. NFC systems have become known, and standards for NFC systems have been ratified. In accordance with the standards, NFC systems are limited to a range of only about 10 centimeters (cm) and are capable of a bit transfer rate of 424 kilobits per second using a carrier frequency of 13.56 MHz. Similar to radio frequency identification (RFID) systems, on which the new NFC standards are based, a principal function for NFC devices is the capacity to interrogate them in a passive mode in which they consume no power and to have a unique code, previously stored, rapidly and reliably returned in a manner which does not interfere with other wireless devices, and which minimizes or avoids interference from such other wireless communications whenever such an interrogation is made. NFC devices transmit information by inductive electromagnetic coupling in the radio frequency portion of the spectrum. The NFC standards also provide for software that enables nearly instantaneous peer-to-peer network setup. NFC devices thus effectively seek each other and establish a communication link between each other. Further, NFC devices can be set to either an active or passive mode such that identification data can be sent even when the device is off and consuming no power. Even in an active mode, the range of NFC devices is so small that very little power is consumed. Accordingly, NFC devices have been implemented in single chips and chip sets for a wide variety of applications, and are appropriate for use in connection with the system 100 described in this document.

Figure 3A:
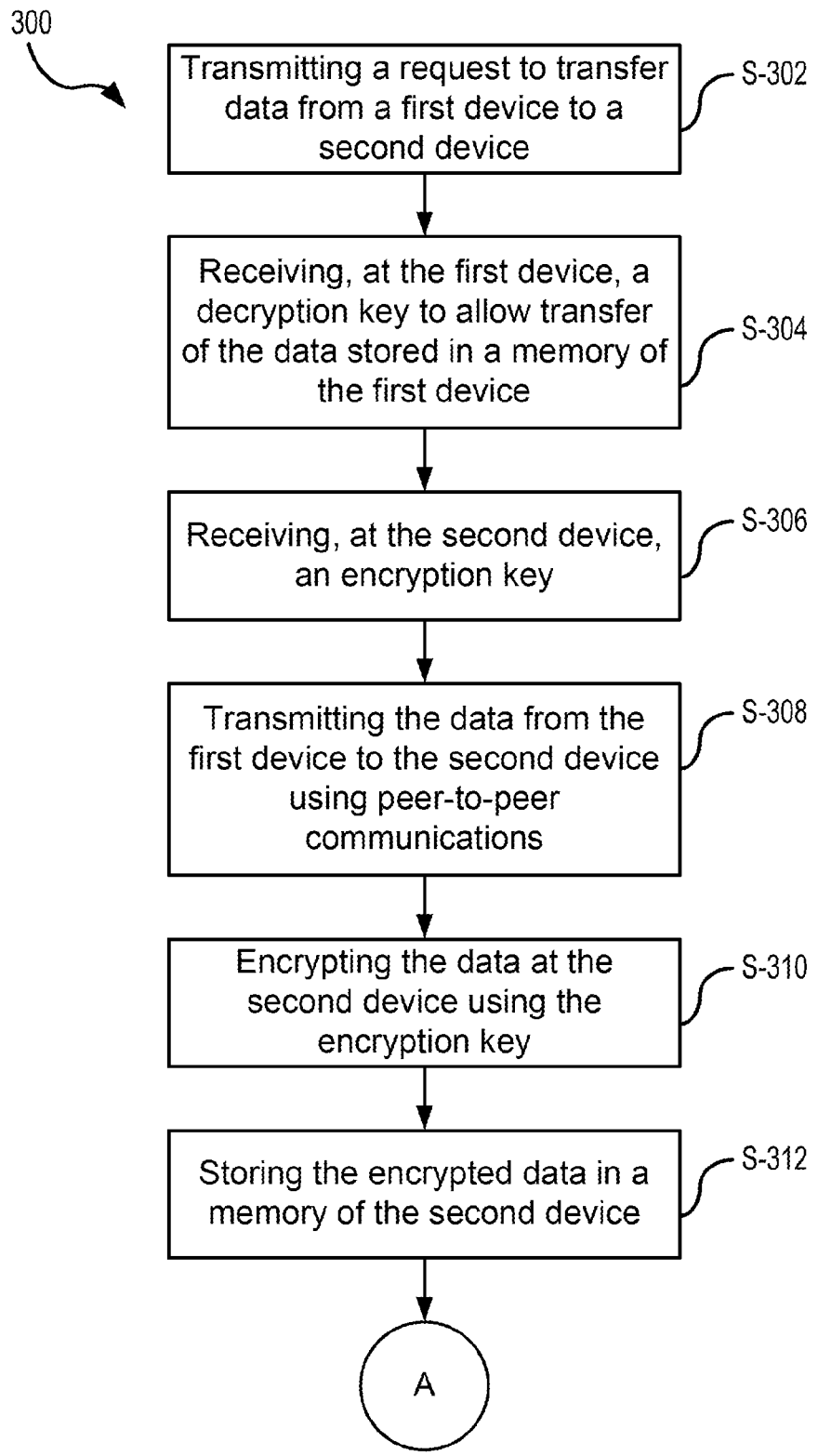
FIGS. 3A and 3B are flow diagrams illustrating a method for peer-to-peer transfer of secure data using NFC in accordance with various embodiments.
Figure 3B:
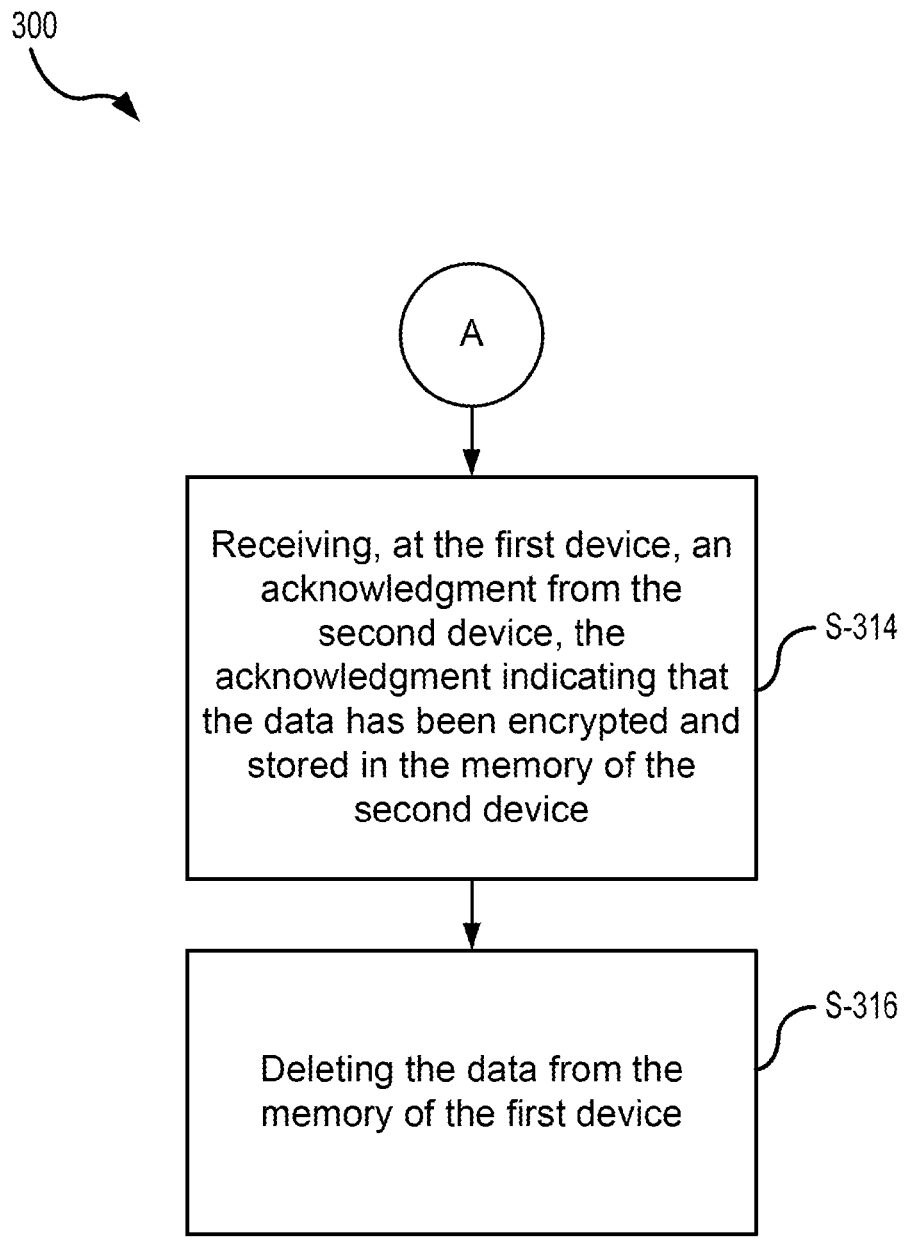

FIGS. 3A and 3B are flow diagrams illustrating a method for peer-to-peer transfer of secure data using near field communications in accordance with various embodiments. Referring to FIGS. 1, 2, 3A and 3B, the TSM 102 stores decryption keys 106 and encryption keys 108 in its memory 104. The decryption keys 106 are used to decrypt the financial data stored on the first device 111 and the encryption keys 108 are used to encrypt the financial data when transferred to the second device 112. For security reasons, the decryption and encryption keys 106 and 108 are stored only temporarily on the first and second devices 111 and 112, respectively. That is, the first device 111 may obtain the decryption key 106 from the TSM 102 using the over-the-air interface 110 and the second device 112 may obtain the encryption key 108 from the TSM 102 using the over-the-air interface 110. When the transfer of the financial data has been completed, the first device 111 erases or discards the decryption key 106 and the second device 112 erases or discards the encryption key 108 to enhance the security of the financial data.

The user generally uses the financial data stored on the first device 111 to conduct financial transactions, such as the payment for goods or services, using NFC. For example, the user may place the first device 111 near an NFC-enabled point-of-sale device, which reads the financial data and authorizes the financial transaction. At some later point in time, the user may wish to get rid of the first device 111 and purchase the second device 112, which is faster, newer or has more state of art functionality when compared to the first device 111. In the past, the transfer of the financial data from the first device 111 to the second device 112 was not possible. However, at step S-302, the first device 111 transmits a request to transfer the financial data to the second device 112. The request to transfer sets up and configures the first device 111 and the second device 112 to begin the process of transferring the financial data. In addition, the first device 111 and the second device 112 transmit authentication information to the TSM 102 indicating that the first device 111 and the second device 112 are the proper devices for the transfer of the financial information.

Once the first device 111 is ready for the transfer, the TSM 102 transfers a decryption key 106 to the first device 111 and the first device 111 receives the decryption key 106 (step S-304). The decryption key 106 may be transmitted across the over-the-air interface 110 to the first device 111, thus enabling the financial data to be accessed and read by the first device 111 and transferred to the second device 112. The first device 111 cannot transfer the financial data to the second device 112 without the proper decryption key 106. The decryption key 106 is temporarily stored locally in the memory 204 of the first device 111.

Once the second device 112 is ready for the transfer, the TSM 102 transfers an encryption key 108 to the second device 112 and the second device 112 receives the encryption key 108 (step S-306). The encryption key 108 may be transmitted across the over-the-air interface 110 to the second device 112, thus enabling the second device 112 to encrypt the financial data using the encryption key 108. The second device 112 cannot encrypt the financial data without the proper encryption key 108. The encryption key 108 is temporarily stored locally in the memory 204 of the second device 112.

Once the first device 111 has the proper decryption key 106 and the second device 112 has the proper encryption key 108, the first device 111 and the second device 112 should be sufficiently close to one another for the transfer of the financial data using peer-to-peer communications or NFC. That is, NFC allows for the transfer of data when the transferring device and the receiving device are brought into operational proximity to one another, currently between about one centimeter and ten centimeters. At step S-308, the first device 111 transmits the financial data to the second device 112 using peer-to-peer communications or NFC.

Once the financial data is received by the second device 112, the second device 112 encrypts the financial data using the encryption key 108 received from the TSM 102 (step S-310). At step S-312, the encrypted financial data is stored in the memory 204 of the second device 112.

After the financial data is encrypted and stored, the second device 112 transmits an acknowledgement to the first device 111. The acknowledgement indicates to the first device 111 that the financial data has been encrypted and stored in the memory 204 of the second device 112. After receipt of the acknowledgement, the first device 111 deletes the financial data from its memory 204. In one embodiment, deleting the financial data from the memory 204 of the first device 111 includes writing dummy data to the memory 204 of the first device 111 at a location where the financial data has been stored. The dummy data includes 0's, 1's, and combinations thereof.

After the financial data has been transferred from the first device 111 to the second device 112 and the financial data has been deleted from the memory 204 of the first device 111, the first device 111 deletes the decryption key 106 temporarily stored in its memory 204 and transmits a deleted decryption key acknowledgement to the TSM 102 indicating that the decryption key 106 has been deleted from its memory 204. In addition, the second device 112 deletes the encryption key 108 temporarily stored in its memory 204 and transmits a deleted encryption key acknowledgement to the TSM 102 indicating that the encryption key 108 has been deleted from its memory 204. The deleted decryption key acknowledgement and the deleted encryption key acknowledgement confirm to the TSM 102 that the decryption key 106 and the encryption key 108 have been deleted.

Figure 4:
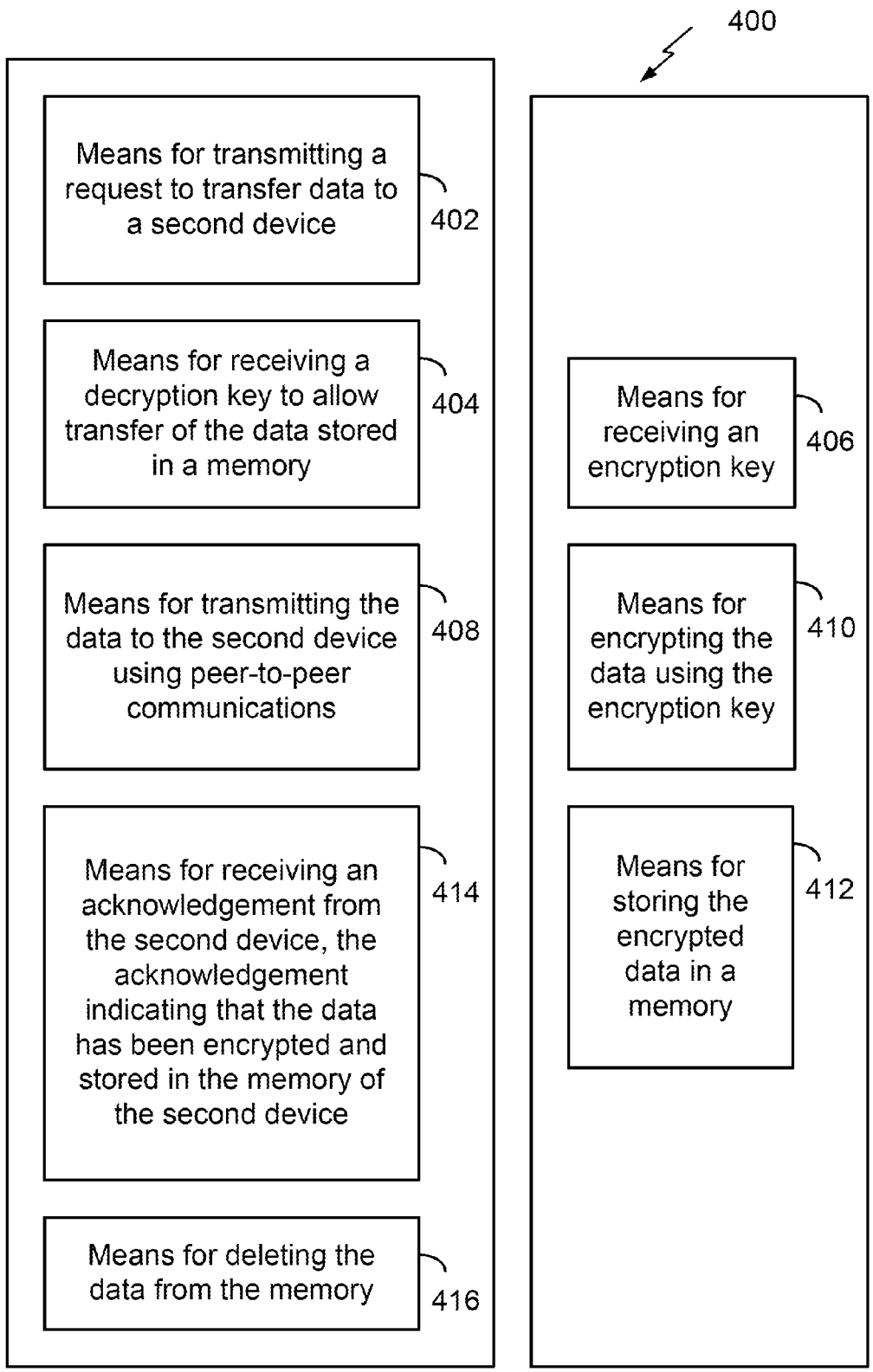
FIG. 4 is a block diagram illustrating exemplary components for the apparatus and the means for apparatus for peer-to-peer transfer of secure data using NFC in accordance with various embodiments.

FIG. 4 is a block diagram illustrating exemplary components for the apparatus 400 and the means for apparatus 400 for peer-to-peer transfer of secure financial data using NFC in accordance with various embodiments. The apparatus includes a module 402 for transmitting a request to transfer the financial data from the first device 111 to the second device 112, a module 404 for receiving, at the first device 111, a decryption key to allow transfer of the financial data stored in a memory 204 of the first device 111, a module 406 for receiving, at the second device 112, an encryption key, and a module 408 for transmitting the financial data from the first device 111 to the second device 112 using peer-to-peer communications. The apparatus 400 also includes a module 410 for encrypting the financial data at the second device 112 using the encryption key, a module 412 for storing the encrypted financial data in a memory 204 of the second device 112, a module 414 for receiving, at the first device 111, an acknowledgement from the second device 112, the acknowledgement indicating that the financial data has been encrypted and stored in the memory 204 of the second device 112, and a module 416 for deleting the financial data from the memory 204 of the first device 111.

Claim elements and steps in this document have been numbered solely as an aid in understanding the description. The numbering is not intended to, and should not be considered as intending to, indicate the ordering of elements and steps in the claims. In addition, the system shown in drawing FIGS. 1 through 4 shows at least one embodiment of the system that is not intended to be exclusive, but merely illustrative of the disclosed embodiments. Method steps may be interchanged sequentially without departing from the scope of the system. In addition, means-plus-function clauses in the claims are intended to cover the structures described as performing the recited function that includes not only structural equivalents, but also equivalent structures. Likewise, although the system, apparatus and methods provide for use with NFC devises and technologies, that is not a limitation of future uses of the NFC-enabled system, but only recognition of the current ubiquitous nature of NFC technology for transferring financial data, which may, however, change over time.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such that the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of transferring data from a first device to a second device, comprising:
    transmitting, from the first device, a request to transfer the data from the first device to the second device;
    receiving, at the first device, a decryption key to allow transfer and decryption of the data stored in a memory of the first device;
    receiving, at the second device, an encryption key;
    transmitting the data from the first device to the second device using peer-to-peer communications;
    encrypting the data at the second device using the encryption key;
    storing the encrypted data in a memory of the second device;
    receiving, at the first device, an acknowledgement from the second device, the acknowledgement indicating that the data has been encrypted and stored in the memory of the second device;
    deleting the data from the memory of the first device, wherein deleting the data comprises writing dummy data to the memory of the first device, and wherein the dummy data is selected from a group consisting of a 0, a 1, and combinations thereof; and
    transmitting a deleted decryption key acknowledgement from the first device to a trusted services manager.

2. The method of claim 1 further comprising receiving, at the second device, the data from the first device.

3. A method of transferring data from a first device to a second device, comprising:
    transmitting, from the first device, a request to transfer the data from the first device to the second device;
    receiving, at the first device, a decryption key to allow transfer and decryption of the data stored in a memory of the first device;
    receiving, at the second device, an encryption key;
    transmitting the data from the first device to the second device using peer-to-peer communications;
    encrypting the data at the second device using the encryption key;
    storing the encrypted data in a memory of the second device;
    receiving, at the first device, an acknowledgement from the second device, the acknowledgement indicating that the data has been encrypted and stored in the memory of the second device;
    deleting the data from the memory of the first device, wherein deleting the data comprises writing dummy data to the memory of the first device, and wherein the dummy data is selected from a group consisting of a 0, a 1, and combinations thereof; and
    transmitting a deleted encryption key acknowledgement from the second device to a trusted services manager.

4. An apparatus for transferring data, comprising:
a first device configured to:
  transmit a request to transfer the data to a second device;
  receive a decryption key to allow transfer and decryption of the data stored in a memory of the first device;
  transmit the data to the second device using peer-to-peer communications;
  receive an acknowledgement from the second device, the acknowledgement indicating that the data has been encrypted and stored in a memory of the second device;
  delete the data from the memory of the first device, wherein deleting the data comprises writing dummy data to the memory of the first device, and wherein the dummy data is selected from a group consisting of a 0, a 1, and combinations thereof; and
  transmit a deleted decryption key acknowledgement to a trusted services manager; and
a second device configured to:
  receive an encryption key;
  encrypt the data using the encryption key; and
  store the encrypted data in a memory of the second device.

5. The apparatus of claim 4 wherein the second device is further configured to receive the data from the first device.

6. An apparatus for transferring data, comprising:
a first device configured to:
  transmit a request to transfer the data to a second device;
  receive a decryption key to allow transfer and decryption of the data stored in a memory of the first device;
  transmit the data to the second device using peer-to-peer communications;
  receive an acknowledgement from the second device, the acknowledgement indicating that the data has been encrypted and stored in a memory of the second device; and
  delete the data from the memory of the first device, wherein deleting the data comprises writing dummy data to the memory of the first device, and wherein the dummy data is selected from a group consisting of a 0, a 1, and combinations thereof; and
a second device configured to:
  receive an encryption key;
  encrypt the data using the encryption key;
  store the encrypted data in a memory of the second device; and
  transmit a deleted encryption key acknowledgement to a trusted services manager.

7. An apparatus for transferring data, comprising:
first means configured to:
  transmit a request to transfer the data to second means;
  receive a decryption key to allow transfer and decryption of the data stored in a memory of the first means;
  transmit the data to the second means using peer-to-peer communications;
  receive an acknowledgement from the second means, the acknowledgement indicating that the data has been encrypted and stored in a memory of the second means;
  delete the data from the memory of the first means, wherein deleting the data comprises writing dummy data to the memory of the first means, and wherein the dummy data is selected from a group consisting of a 0, a 1, and combinations thereof; and
  transmit a deleted decryption key acknowledgement to a trusted services manager; and
second means configured to:
  receive an encryption key;
  encrypt the data using the encryption key; and
  store the encrypted data in a memory of the second means.

8. The apparatus of claim 7 wherein the second means is further configured to receive the data from the first means.

9. An apparatus for transferring data, comprising:
first means configured to:
  transmit a request to transfer the data to second means;
  receive a decryption key to allow transfer and decryption of the data stored in a memory of the first means;
  transmit the data to the second means using peer-to-peer communications;
  receive an acknowledgement from the second means, the acknowledgement indicating that the data has been encrypted and stored in a memory of the second means; and
  delete the data from the memory of the first means, wherein deleting the data comprises writing dummy data to the memory of the first means, and wherein the dummy data is selected from a group consisting of a 0, a 1, and combinations thereof; and
second means configured to:
  receive an encryption key;
  encrypt the data using the encryption key;
  store the encrypted data in a memory of the second means; and
  transmit a deleted encryption key acknowledgement to a trusted services manager.

10. A non-transitory machine-readable medium comprising instructions for transferring data from a first device to a second device, the instructions upon execution cause a machine to:
  transmit, from the first device, a request to transfer the data from the first device to the second device;
  receive, at the first device, a decryption key to allow transfer and decryption of the data stored in a memory of the first device;
  receive, at the second device, an encryption key;
  transmit the data from the first device to the second device using peer-to-peer communications;
  encrypt the data at the second device using the encryption key;
  store the encrypted data in a memory of the second device;
  receive, at the first device, an acknowledgement from the second device, the acknowledgement indicating that the data has been encrypted and stored in the memory of the second device;
  delete the data from the memory of the first device, wherein deleting the data comprises writing dummy data to the memory of the first device, and wherein the dummy data is selected from a group consisting of a 0, a 1, and combinations thereof; and
  transmit a deleted decryption key acknowledgement from the first device to a trusted services manager.

11. The non-transitory machine-readable medium of claim 10 further comprising instructions to receive, at the second device, the data from the first device.

12. A non-transitory machine-readable medium comprising instructions for transferring data from a first device to a second device, the instructions upon execution cause a machine to:
  transmit, from the first device, a request to transfer the data from the first device to the second device;

receive, at the first device, a decryption key to allow transfer and decryption of the data stored in a memory of the first device;
receive, at the second device, an encryption key;
transmit the data from the first device to the second device using peer-to-peer communications;
encrypt the data at the second device using the encryption key;
store the encrypted data in a memory of the second device;
receive, at the first device, an acknowledgement from the second device, the acknowledgement indicating that the data has been encrypted and stored in the memory of the second device;
delete the data from the memory of the first device, wherein deleting the data comprises writing dummy data to the memory of the first device, and wherein the dummy data is selected from a group consisting of a 0, a 1, and combinations thereof; and
transmit a deleted encryption key acknowledgement from the second device to a trusted services manager.

* * * * *